(12) United States Patent
Kim et al.

(10) Patent No.: US 12,263,735 B2
(45) Date of Patent: Apr. 1, 2025

(54) HYBRID DRIVING MODULE

(71) Applicant: VALEO KAPEC CO., LTD., Daegu (KR)

(72) Inventors: Jung-Woo Kim, Daegu (KR); Jin-Su Park, Daegu (KR)

(73) Assignee: VALEO KAPEC CO., LTD., Daegu (KR)

( * ) Notice: Subject to any disclaimer, the term of this patent is extended or adjusted under 35 U.S.C. 154(b) by 250 days.

(21) Appl. No.: 17/760,020

(22) PCT Filed: Jan. 22, 2021

(86) PCT No.: PCT/KR2021/000866
§ 371 (c)(1),
(2) Date: Aug. 3, 2022

(87) PCT Pub. No.: WO2021/157919
PCT Pub. Date: Aug. 12, 2021

(65) Prior Publication Data
US 2023/0043913 A1    Feb. 9, 2023

(30) Foreign Application Priority Data
Feb. 4, 2020 (KR) .................. 10-2020-0012937

(51) Int. Cl.
*B60K 6/26* (2007.10)
*B60K 6/38* (2007.10)
*F16D 25/10* (2006.01)

(52) U.S. Cl.
CPC .................. *B60K 6/26* (2013.01); *B60K 6/38* (2013.01); *F16D 25/10* (2013.01); *B60K 2006/262* (2013.01); *B60Y 2200/92* (2013.01)

(58) Field of Classification Search
CPC ...... B60K 6/26; B60K 6/38; B60K 2006/262; B60K 6/405; B60K 2006/4825;
(Continued)

(56) References Cited

U.S. PATENT DOCUMENTS

| 4,919,006 A | 4/1990 | Willett et al. |
| 9,157,495 B2 | 10/2015 | Frait et al. |

(Continued)

FOREIGN PATENT DOCUMENTS

| CA | 454850 A | 3/1949 |
| CN | 101332763 A | 12/2008 |

(Continued)

OTHER PUBLICATIONS

JP-2016033003-A English Translation (Year: 2016).*

(Continued)

*Primary Examiner* — James A Shriver, II
*Assistant Examiner* — Michael T. Walsh
(74) *Attorney, Agent, or Firm* — Oblon, McClelland, Maier & Neustadt, L.L.P.

(57) ABSTRACT

A hybrid driving module includes a rotor with a hub ridge provided on a rotor hub to enable vibration noise to be reduced, and the hub ridge supports the rotor in a state in which the hub ridge is fastened to the rotor hub. The hybrid driving module may further include a ridge fixing structure that prevents the hub ridge from separating from the rotor hub. For example, the ridge fixing structure may be a ridge snap ring. The hybrid driving module may further include an elastic body that elastically presses the hub ridge toward the ridge snap ring. The elastic body may elastically press the rotor in the axial direction. The elastic body may also serve as a return spring of the piston plate of the engine clutch.

10 Claims, 5 Drawing Sheets

(58) Field of Classification Search
CPC .. B60K 6/387; B60K 6/40; B60K 6/48; F16D 25/10; F16D 2021/0661; F16D 2021/0692; F16D 13/683; F16D 25/0638; B60Y 2200/92; Y02T 10/62

See application file for complete search history.

(56) References Cited

U.S. PATENT DOCUMENTS

| | | | |
|---|---|---|---|
| 9,416,826 | B2 | 8/2016 | Frait |
| 10,274,018 | B2 * | 4/2019 | Yang ................... B60K 17/02 |
| 10,309,462 | B2 | 6/2019 | Yang |
| 11,581,787 | B2 * | 2/2023 | Angel ................... B60K 6/26 |
| 2006/0289209 | A1 * | 12/2006 | Grosspietsch ......... B60L 50/16 180/65.25 |
| 2007/0175723 | A1 | 8/2007 | Blessing et al. |
| 2010/0261574 | A1 | 10/2010 | Samie et al. |
| 2015/0114779 | A1 | 4/2015 | Frait et al. |
| 2015/0114787 | A1 | 4/2015 | Brevick et al. |
| 2018/0112718 | A1 | 4/2018 | Yang |
| 2018/0112719 | A1 | 4/2018 | Yang |
| 2018/0328413 | A1 | 11/2018 | Yagyu et al. |
| 2019/0271362 | A1 | 9/2019 | Lorenz |

FOREIGN PATENT DOCUMENTS

| | | | | |
|---|---|---|---|---|
| CN | 102187547 | A * | 9/2011 | ............... H02K 1/02 |
| CN | 102710062 | A * | 10/2012 | |
| CN | 103206469 | A | 7/2013 | |
| CN | 103223851 | A | 7/2013 | |
| CN | 103826894 | A | 5/2014 | |
| CN | 104553736 | A | 4/2015 | |
| CN | 106536248 | A | 3/2017 | |
| CN | 107972472 | A | 5/2018 | |
| CN | 107972473 | A | 5/2018 | |
| DE | 10 2009 042 826 | A1 | 4/2010 | |
| DE | 10 2015 100 150 | A1 | 7/2015 | |
| DE | 10 2015 115 478 | A1 | 3/2016 | |
| DE | 10 2015 221 368 | A1 | 5/2017 | |
| DE | 102018106653 | A1 * | 9/2018 | ............... B60K 6/26 |
| EP | 2 913 554 | A2 | 9/2015 | |
| JP | 2005-522619 | A | 7/2005 | |
| JP | 2009001127 | A * | 1/2009 | |
| JP | 2011-214655 | A | 10/2011 | |
| JP | 2016-33003 | A | 3/2016 | |
| JP | 2016033003 | A * | 3/2016 | ............... B60K 6/387 |
| KR | 10-2010-0015063 | A | 2/2010 | |
| KR | 10-2011-0090582 | A | 8/2011 | |
| KR | 10-1155647 | B1 | 6/2012 | |
| KR | 101428081 | B1 * | 8/2014 | |
| KR | 10-1459777 | B1 | 11/2014 | |
| KR | 10-1765644 | B1 | 8/2017 | |
| KR | 10-1765645 | B1 | 8/2017 | |
| KR | 20210072494 | A * | 6/2021 | |

OTHER PUBLICATIONS

KR-101428081-B1 English Translation (Year: 2014).*
DE-102018106653-A1 English Translation (Year: 2018).*
JP-2009001127-A English Translation (Year: 2009).*
CN-102187547-A English Translation (Year: 2011).*
International Search Report issued May 3, 2021 in PCT/KR2021/000866, filed on Jan. 22, 2021, 2 pages.
Combined Chinese Notification Of The Decision To Grant A Patent Right For Patent For Invention and Search Report issued in corresponding Chinese Patent Application No. 202180012320.7 (with English Translation and English Translation of Category of Cited Documents), 11 pages.

* cited by examiner

FIG. 8

HYBRID DRIVING MODULE

TECHNICAL FIELD

The present invention relates to a hybrid driving module, and more particularly, to a hybrid driving module, in which a rotor is fixed as a hub ridge of the rotor is installed on a rotor hub, and the hub ridge is securely installed on the rotor hub, thereby reducing vibration and noise.

BACKGROUND ART

A driving module used for a hybrid vehicle has a structure configured to transmit a force of a motor and a force of an engine to a transmission. A hybrid driving module includes an input member configured to receive the force of the engine, a motor, an engine clutch configured to connect the input member and the motor, an output member configured to receive the force of the motor and/or the engine and transmit the force to the transmission, and a power transmission part configured to connect the motor and the output member. The power transmission part may have a structure configured to connect the motor directly to the output member or including a torque converter and a lock-up clutch.

The motor includes a stator and a rotor, and the rotor may be installed on a rotor hub. A space in which the clutch and the like are installed is provided in a radial internal space of the rotor defined by the rotor hub. After the clutch and the like are installed in the space, a cover or a hub ridge is installed to cover the space. The hub ridge is installed to rotate integrally with the rotor hub.

U.S. Pat. No. 9,416,826 B2 (Patent Document 1), US 2006/0289209 A1 (Patent Document 2), and KR 1459777 B1 (Patent Document 3) each disclose a structure in which a hub ridge is installed on a rotor hub. The hub ridge is axially fitted with and coupled to a spline portion provided on the rotor hub, such that the rotations of the hub ridge and the rotor hub are restricted. A snap ring fixed to the rotor hub prevents the hub ridge from separating from the rotor hub.

However, the snap ring merely restricts a movement of the hub ridge in one direction in the axial direction relative to the rotor hub. That is, the hub ridge may have a clearance in which the rotor hub may move to some extent in the axial direction. For example, Patent Documents 1 and 2 each disclose a structure in which one side of the hub ridge based on the axial direction is supported by the snap ring, and the other side of the hub ridge is supported by an engine clutch. The engine clutch structurally inevitably has a gap formed between the engine clutch and a piston plate. This gap provides a clearance in which the hub ridge may vibrate in the axial direction. For this reason, there is a risk that the hub ridge may generate noise while vibrating relative to the rotor hub. In particular, because this noise is generated when only the motor operates but the engine does not operate, a driver recognizes the noise as a loud sound.

Patent Document 3 discloses a structure in which a hub ridge of a hybrid driving module is used as an output member. When the hub ridge is used as the output member, the hub ridge receives a rotational force from the rotor hub in all situations in which the hybrid driving module operates a transmission, such that noise caused by the clearance may be reduced. However, because the hub ridge is a member that receives torque made by summing up torque of the engine and torque of the motor, a coupling structure between the hub ridge and the rotor hub needs to be very secure, and the hub ridge needs to have high strength.

Further, all the hybrid driving modules disclosed in Patent Documents 1 to 3 have problems in that manufacturing processes are complicated because a process of fixing the rotor to the rotor hub in the axial direction and a process of fixing the hub ridge to the rotor hub are separately performed.

DISCLOSURE

Technical Problem

The present invention has been made in an effort to solve the above-mentioned problems, and an object of the present invention is to provide a hybrid driving module, in which a process of fixing a hub ridge to a rotor hub and a process of fixing a rotor to the rotor hub may be performed at one time, thereby reducing the number of manufacturing processes.

Another object of the present invention is to provide a hybrid driving module, in which a hub ridge may fix a rotor to a rotor hub, and the hub ridge may be prevented from moving in the axial direction.

Still another object of the present invention is to provide a hybrid driving module, in which assembling difficulty may be reduced by adding a simple elastic body, a hub ridge may assuredly fix a rotor to a rotor hub, and the rotor may assuredly prevent an axial motion of the hub ridge.

Technical Solution

To achieve the above-mentioned objects, the present invention provides a hybrid driving module having a structure in which a hub ridge supports a rotor in a state in which the hub ridge is fastened to a rotor hub on which a rotor is installed.

The hybrid driving module may further include a ridge fixing structure that prevents the hub ridge from separating from the rotor hub. For example, the ridge fixing structure may be a ridge snap ring.

The hybrid driving module may further include an elastic body that elastically presses the hub ridge toward the ridge snap ring.

The elastic body may elastically press the rotor in the axial direction.

The elastic body may also serve as a return spring of the piston plate of the engine clutch.

Specifically, a hybrid driving module according to the present invention includes: a motor 40 including a stator 41 and a rotor 42; a rotor hub 43 configured to support the rotor 42 and rotate integrally with the rotor 42; and a hub ridge 46 coupled to the rotor hub 43 so that a rotation thereof is restricted by the rotor hub 43.

The rotor hub 43 may include a rotor holder 44 configured to support the rotor.

The rotor hub 43 may have a hub plate 45 extending radially inward from the rotor holder 44.

The rotor holder 44 may include: a radial support portion 441 extending in an axial direction and configured to support a radial inner portion of the rotor 42; an axial support portion 442 disposed at one side of the radial support portion 441 based on the axial direction, extending in a radial direction from the radial support portion 441, and configured to support one side of the rotor 42 based on the axial direction; a plurality of spline shape portions 443 provided at the other side of the radial support portion 441 based on the axial direction and further extending to the other side in the axial direction from the other end of the radial support portion 441 based on the axial direction; and a plurality of spline grooves 444 provided between the plurality of spline shape portions 443 and opened at the other side based on the axial direction.

The hub ridge 46 may include: a plurality of fitting portions 461, of which the rotations are restricted by the rotor hub 43 by interfering with the spline shape portion 443 in a circumferential direction in a state in which the plurality of fitting portions 461 are respectively inserted into the plurality of spline grooves 444: a radius extension portion 462 further extending radially outward from the fitting portions 461 and further protruding outward in the radial direction than the radial support portion 441; and an accommodation groove 463 provided between the plurality of fitting portions 461 and configured to accommodate the spline shape portion 443.

The radius extension portion 462 may support the other side of the rotor 42 based on the axial direction.

A ridge fixing member may be installed on the spline shape portion 443 and supports the other side surface of the hub ridge 46 in the axial direction so that the hub ridge 46 does not separate to the other side based on the axial direction.

The spline shape portion 443 may have a snap groove 4433 extending in the circumferential direction from an inner peripheral surface thereof. The ridge fixing member may include a ridge snap ring 49 fitted with the snap groove 4433.

The radius extension portion 462 may have a ring shape connected in the circumferential direction, and the accommodation groove 463 may have a hole shape closed in the circumferential direction and the radial direction and penetrated in the axial direction.

The hybrid driving module may further include an elastic body 90 configured to elastically bias the hub ridge 46 in the other direction of the axial direction.

The elastic body 90 may include a first elastic body 91 interposed between the radius extension portion 462 and the rotor 42.

The elastic body 90 may include a second elastic body 92 interposed between the rotor 42 and the axial support portion 442.

An engine clutch 20 including a clutch pack 22 may be provided in a space at a radial inner side of the radial support portion 441 and disposed one side based on the axial direction from the hub ridge 46.

A first carrier 23 of the engine clutch 20 may be fixed to the rotor hub 43.

A first piston plate 21 may be disposed between the first clutch pack 22 and the hub ridge 46 and slide in the axial direction so as to press or release the first clutch pack 22 in the axial direction.

The elastic body 90 may include a third elastic body 93 interposed between the first carrier 23 and the hub ridge 46.

The elastic body 90 may include a fourth elastic body 94 provided in the first clutch pack 22 to elastically bias the first clutch pack 22 in a direction in which the first clutch pack 22 is spread in the axial direction. An elastic force of the fourth elastic body 94 may bias the first piston plate 21 in the other direction of the axial direction.

The elastic body 90 may include one of or two or more of the first elastic body 91, the second elastic body 92, the third elastic body 93, and the fourth elastic body 94.

An input member 10 may be provided at an axial front side from the hub plate 45 and receive an output of an engine.

The hub ridge 46 may be disposed at an axial front side than the hub plate 45.

An output member 70 may be provided at an axial rear side from the hub plate 45 and transmit power of the hybrid driving module to a transmission.

Advantageous Effects

According to the hybrid driving module of the present invention, the hub ridge supports the rotor in the state in which the hub ridge is fastened to the rotor hub on which the rotor is installed. Therefore, the process of fixing the hub ridge to the rotor hub and the process of fixing the rotor to the rotor hub may be performed at one time, thereby reducing the number of manufacturing processes.

According to the hybrid driving module according to the present invention, the elastic body elastically presses the hub ridge toward the ridge snap ring, such that the hub ridge is prevented from moving in the axial direction. Therefore, it is possible to reduce noise.

According to the hybrid driving module according to the present invention, the elastic body elastically presses the rotor. Therefore, it is possible to reduce assembling difficulty by adding the simple elastic body, allow the hub ridge to assuredly fix the rotor to the rotor hub, and the rotor may assuredly support the hub ridge so that the hub ridge does not move in the axial direction.

The specific effects of the present invention, together with the above-mentioned effects, will be described along with the description of specific items for carrying out the present invention.

DESCRIPTION OF MAIN REFERENCE NUMERALS OF DRAWINGS

9: Spring damper
10: Input member
102: Spline
12: Input plate
13: Bearing snap ring
20: Engine clutch
21: First piston plate
22: First clutch pack
23: First carrier
40: Motor
41: Stator
42: Rotor
420: Retainer
43: Rotor hub
44: Rotor holder
441: Radial support portion
442: Axial support portion 443: Spline shape portion
4433: Snap groove
444: Spline groove
45: Hub plate
46: Hub ridge
460: Hub coupling portion
461: Fitting portion
462: Radius extension portion
463: Accommodation groove
464: Piston installation portion
465: Radial outer-inner peripheral surface
466: Radial inner-outer peripheral surface
467: Flow hole
468: Slide protrusion
49: Ridge snap ring (ridge fixing member)
50: Fluid clutch
51: Impeller
52: Back cover
53: Bolt
54: Turbine
55: Turbine plate
56: Reactor
57: One-way clutch
60: Lock-up clutch
61: Second piston plate
62: Second clutch pack
64: Output plate
70: Output member
75: Fixed end
80: Housing
90: Elastic body
91: First elastic body
92: Second elastic body
93: Third elastic body
94: Fourth elastic body
S1, S2, S3: Sealing member
B1, B2, B3, B4, B5, B6: Bearing
A1, A2, A3, A4: Space

MODE FOR INVENTION

Hereinafter, exemplary embodiments of the present invention will be described in detail with reference to the accompanying drawings.

The present invention is not limited to the embodiments disclosed herein, but will be variously changed and implemented in various different forms. The embodiments are provided so that the present invention will be thorough and complete, and also to provide a more complete understanding of the scope of the present invention to those of ordinary skill in the art. Therefore, it should be understood that the present invention is not limited to the embodiments disclosed below, but the configuration of any one embodiment and the configuration of another embodiment can be substituted or added, and the present invention includes all alterations, equivalents, and alternatives that are included in the technical spirit and scope of the present invention.

It should be interpreted that the accompanying drawings are provided only to allow those skilled in the art to easily understand the exemplary embodiments disclosed in the present specification, and the technical spirit disclosed in the present specification is not limited by the accompanying drawings, and includes all alterations, equivalents, and alternatives that are included in the spirit and the technical scope of the present invention. In the drawings, sizes or thicknesses of constituent elements may be exaggerated, increased, or decreased for convenience of understanding, but the protection scope of the present invention should not be restrictively construed.

The terms used in the present specification are used only for the purpose of describing particular examples or embodiments and are not intended to limit the present invention. Further, singular expressions include plural expressions unless clearly described as different meanings in the context. In the present application, the terms "comprises," "comprising," "includes," "including," "containing," "has," "having", and other variations thereof are inclusive and therefore specify the presence of features, integers, steps, operations, elements, components, and/or combinations thereof disclosed in the specification. That is, in the present application, the terms "comprises," "comprising," "includes," "including," "containing," "has," "having", and other variations thereof do not preclude the presence or addition of one or more other features, integers, steps, operations, elements, components, and/or combinations thereof.

The terms including ordinal numbers such as "first," "second," and the like may be used to describe various constituent elements, but the constituent elements are not limited by the terms. These terms are used only to distinguish one constituent element from another constituent element.

When one constituent element is described as being "coupled" or "connected" to another constituent element, it should be understood that one constituent element can be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements.

When one constituent element is described as being "disposed above" or "disposed below" another constituent element, it should be understood that one constituent element can be disposed directly on another constituent element, and an intervening constituent element can also be present between the constituent elements.

Unless otherwise defined, all terms used herein, including technical or scientific terms, have the same meaning as commonly understood by those skilled in the art to which the present invention pertains. The terms such as those defined in a commonly used dictionary should be interpreted as having meanings consistent with meanings in the context of related technologies and should not be interpreted as ideal or excessively formal meanings unless explicitly defined in the present application.

Because a hybrid driving module according to an embodiment is symmetrical with respect to an axis, only the half of the hybrid driving module based on the axis is illustrated for the convenience of illustration. In addition, for the convenience of description, a direction along a longitudinal direction of an axis defining a center of a rotation of the hybrid driving module is defined as an axial direction. That is, a forward/backward direction or an axial direction is defined as a direction parallel to a rotation axis. A front (forward) means any one direction of a power source, e.g., a direction toward an engine. A rear (backward) means the other direction, e.g., a direction toward a transmission. Therefore, a front surface means a surface facing forward, and a rear surface means a surface facing backward.

A radial direction means a direction toward or away from a center of the rotation axis along a straight line passing through the center of the rotation axis on the plane perpendicular to the rotation axis. A direction radially away from the center is referred to as a centrifugal direction, and a direction toward the center is referred to as a centripetal direction.

A peripheral direction or a circumferential direction means a direction surrounding a periphery of the rotation axis. An outer periphery means an outer circumference, and an inner periphery means an inner circumference. Therefore, an outer peripheral surface is a surface facing away from the rotation axis, and an inner peripheral surface is a surface facing the rotation axis.

A circumferential surface means a surface, a normal line of which is directed in a circumferential direction.

[Hybrid Driving Module]

Figure 1:
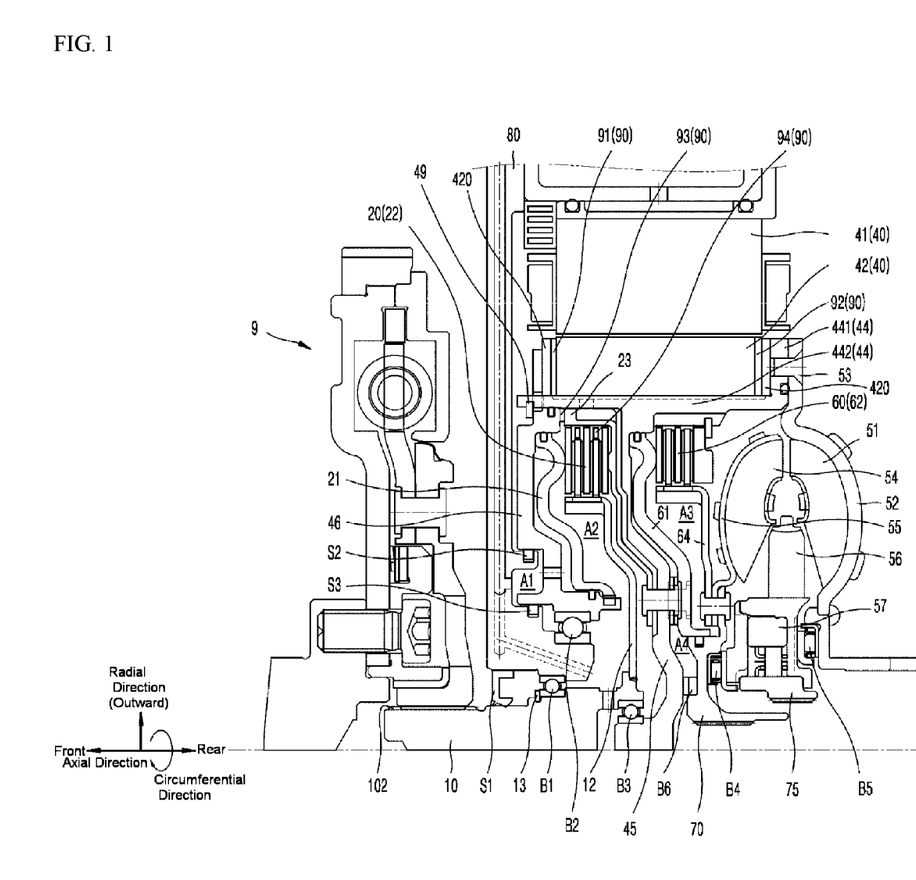
FIG. 1 is a conceptual view of an embodiment of a hybrid driving module according to the present invention.
Figure 2:
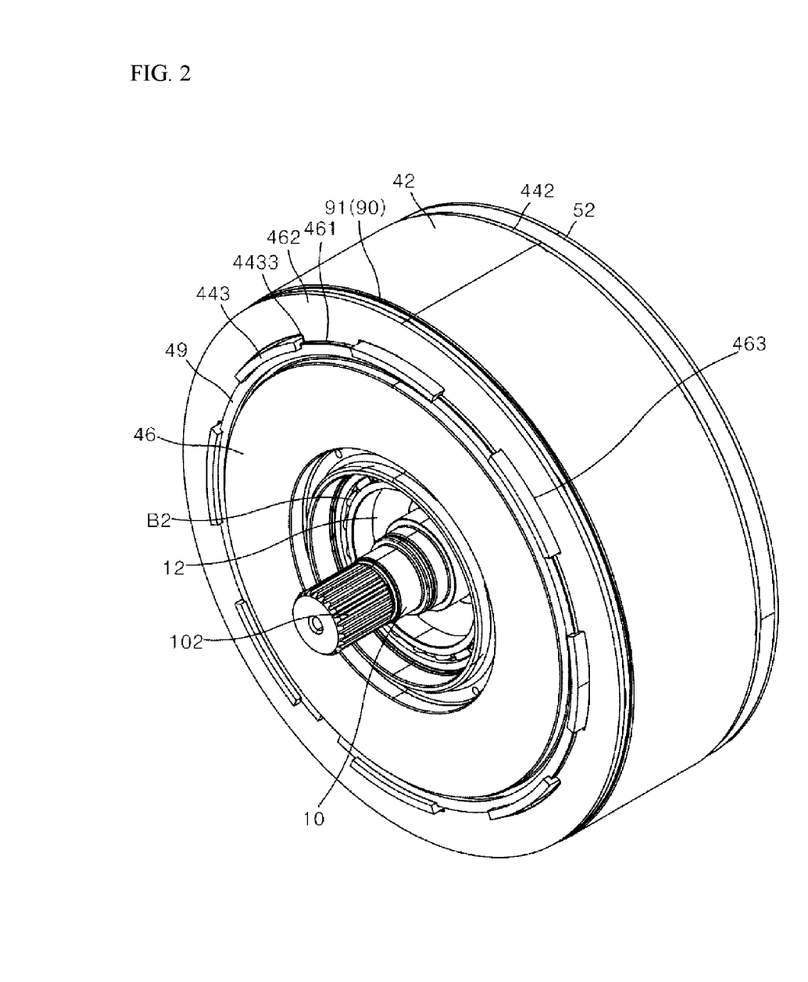
FIG. 2 is a perspective view illustrating the hybrid driving module in FIG. 1 in a state in which a spring damper, a stator of a motor, and a housing are not illustrated.
Figure 3:
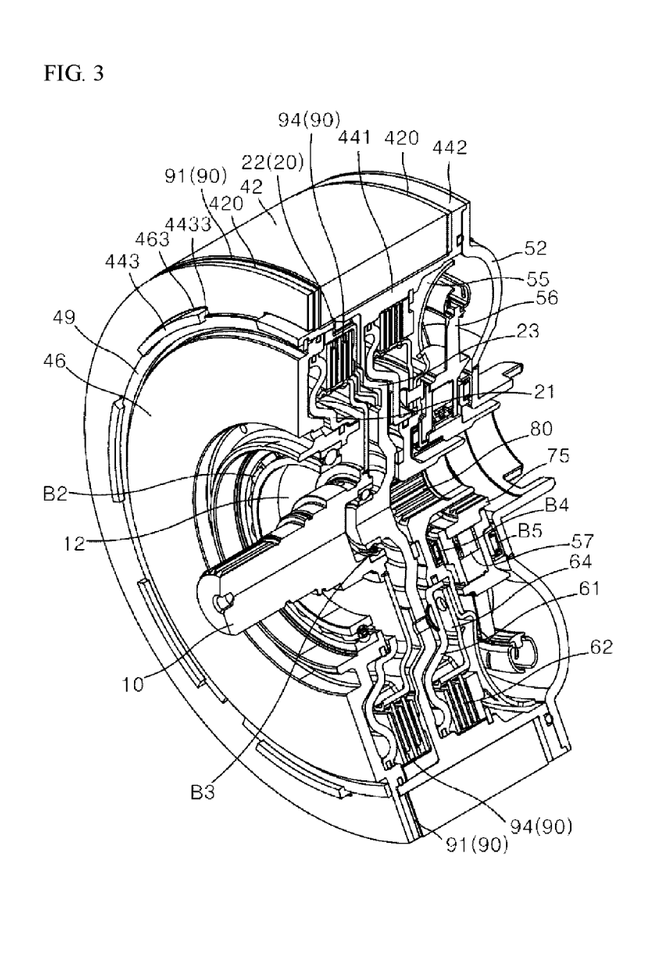
FIG. 3 is a cross-sectional perspective view of FIG. 2.

Hereinafter, a structure of a hybrid driving module according to an embodiment will be described with reference to FIGS. 1 to 3.

The hybrid driving module according to the embodiment includes an input member 10 connected to an output side of an engine and configured to receive an output of the engine, and an output member 70 configured to transmit driving power of a motor or driving power of the motor and the engine to a transmission.

The output of the engine is inputted to the input member 10 via a spring damper 9. The spring damper 9 engages with a spline 102 of the input member 10, and a mutual rotation thereof is restricted. The spring damper 9 mitigates fluctuation of the output of the engine to suppress the occurrence of vibration.

The spline 102 is provided on an outer peripheral surface of an axial front side of the input member 10. Further, an input plate 12 extending outward in a radial direction is connected to an outer peripheral surface of an axial rear side of the input member 10. The input plate 12 is integrally fixed to the input member 10 and rotates integrally with the input member 10.

An engine clutch 20 is connected to a radial outer end of the input member 10. The engine clutch 20 is provided between a rotor hub 43 and the input member 10 and transmits or does not transmit the output of the engine to the rotor hub 43.

The hybrid driving module includes a motor 40. The motor 40 includes an annular stator 41, and an annular rotor 42 disposed at a radial inner side of the stator 41. The rotor 42 is rotated by an electromagnetic interaction with the stator 41.

The stator 41 is fixed to a housing 80. The housing 80 is disposed forward of the motor 40 in the axial direction and extends in the radial direction. The input member 10 is rotatably supported at a radial inner end of the housing 80 by a first bearing B1. The first bearing B1 is fixed in the axial direction by a bearing snap ring 13 fitted into an outer peripheral surface of the input member 10. A first sealing member S1 configured to seal a fluid in the housing is provided between the input member 10 and the housing 80.

The rotor 42 is fixed to the rotor hub 43. The rotor hub 43 includes a rotor holder 44 configured to fix the rotor 42, and a hub plate 45 extending radially inward from the rotor holder 44.

The rotor holder 44 includes a radial support portion 441 configured to support an inner peripheral surface of the rotor 42, and an axial support portion 442 configured to support an axial rear end of the rotor 42. The radial support portion 441 may have a cylindrical shape extending in the axial direction. The axial support portion 442 may have a shape extending outward in the radial direction from the axial rear end of the radial support portion 441.

The hub plate 45 is connected to the rotor holder 44 in the vicinity of an axial central portion of the radial support portion 441. A central portion of a radius of the hub plate 45 extends forward and is supported to be relatively rotatable by means of the input member 10 and the third bearing B3.

The input plate 12 and the engine clutch 20 are disposed in a space disposed forward of the hub plate 45. The engine clutch 20 includes a first clutch pack 22 having a friction plate or a friction member. The first carrier 23 of the engine clutch 20 is connected to the rotor hub 43 so that the rotation of the first carrier 23 is restricted. The first clutch pack 22 is disposed between the input plate 12 and the first carrier 23.

A first piston plate 21 is disposed at the axial front side of the first clutch pack 22. When the first piston plate 21 presses the first clutch pack 22 in the axial direction, the input plate 12 and the first carrier 23 are connected so that the mutual rotations thereof are restricted. Therefore, the output of the engine transmitted to the input plate 12 may be transmitted to the rotor hub 43 via the engine clutch 20. When the first piston plate 21 does not press the first clutch pack 22, the mutual rotations of the input plate 12 and the first carrier 23 are not restricted. Therefore, the output of the engine is transmitted only to the input plate 12 without being transmitted to the rotor hub 43.

The hub ridge is disposed at an axial front side of the first piston plate 21. The hub ridge 46 extends in the radial direction. A radial outer side of the hub ridge 46 is connected to the rotor holder 44 so that the rotation thereof is restricted.

A radial inner side of the hub ridge 46 is rotatably connected to the housing 80. To this end, a second bearing B2 is interposed between an inner peripheral surface of a radial inner side of the hub ridge 46 and an outer peripheral surface of a radial inner side of the housing 80.

The hub ridge 46 rotates relative to the housing 80, and an annular second sealing member S2 and a third sealing member S3 are installed between the hub ridge 46 and the housing 80 and seal the fluid.

The first piston plate 21 extends in the radial direction. An outer peripheral surface of a radial outer side of the first piston plate 21 and an inner peripheral surface of a radial outer side of the hub ridge 46 face each other and slidably adjoin each other in the axial direction. An inner peripheral surface of a radial inner side of the first piston plate 21 and an outer peripheral surface of a radial inner side of the hub ridge 46 face each other and slidably adjoin each other in the axial direction. Further, a radial inner portion of the hub ridge 46 and a radial inner portion of the first piston plate 21 are connected by key/slot coupling so that the sliding movements thereof are allowed, but the rotations thereof are restricted.

Figure 8:
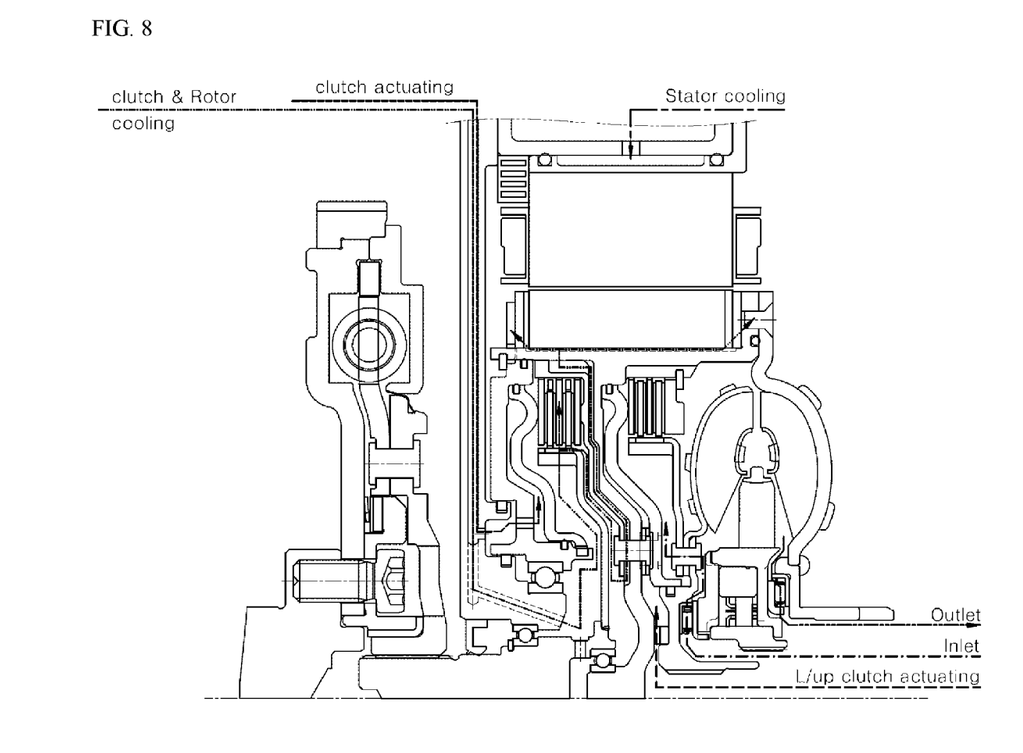
FIG. 8 is a view illustrating a flow control direction of a fluid in FIG. 1.

As illustrated in FIG. 8, when the fluid is introduced into the front space A1 of the first piston plate 21 through the housing 80, the first piston plate 21 moves axially backward relative to the hub ridge 46 and presses the first clutch pack 22.

As illustrated in FIG. 8, when the fluid is introduced into the rear space A2 of the first piston plate 21 through the housing 80, the first piston plate 21 moves axially forward relative to the hub ridge 46 and does not press the first clutch pack 22.

A radial outer end of the hub ridge 46 further extends outward in the radial direction than the radial support portion 441 of the rotor holder 44. A rear surface of the radial outer end of the hub ridge 46 supports an axial front side of the rotor 42.

Retainers 420 may be installed at an axial front side and an axial rear side of the rotor 42 and protect and support the rotor 42. An outer end of the hub ridge 46 may adjoin the retainer 420.

A ridge snap ring 49 is fitted with and fixed to the inner peripheral surface of the radial support portion 441 and prevents the hub ridge 46 from separating axially forward.

A back cover 52 is fixed to the axial support portion 442 of the rotor holder 44 by bolts 53. The back cover 52 extends radially inward from the rotor holder 44. A radial inner end of the back cover 52 is connected to the transmission. An impeller 51 is provided on a front surface of the back cover 52.

The output member 70 is provided between the hub plate 45 and the back cover 52. A spline is formed on an inner peripheral surface of the output member 70 and connected to a non-illustrated input shaft of the transmission. The output member 70 is integrally connected to a turbine plate 55. The turbine plate 55 extends in the radial direction. A turbine 54 is provided on a rear surface of the turbine plate 55 and faces the impeller 51 in the axial direction.

A fixed end 75 is disposed between the back cover 52 and the output member 70. A spline is formed on an inner peripheral surface of the fixed end 75 and connected to a non-illustrated fixed shaft of the transmission.

A reactor 56 is disposed between the impeller 51 and the turbine 54. The reactor 56 is connected to the fixed end 75 through a one-way clutch 57. The impeller 51, the turbine 54, and the reactor 56 constitute a torque converter configured to boost torque of the motor 40 and transmit the torque to the output member 70.

The output member 70 is supported to be rotatable relative to the fixed end 75 by a fourth bearing B4. The back cover 52 is supported to be rotatable relative to the fixed end 75 by a fifth bearing B5. Further, the hub plate 45 and the output member 70 are supported to be rotatable relative to each other by a sixth bearing B6.

A lock-up clutch 60 is installed rearward of the hub plate 45 and provided on an inner peripheral surface of the rotor holder 44. An output plate 64 is integrally connected to the output member 70. The output plate 64 extends radially from the output member 70 to the lock-up clutch 60. The output plate 64 is rotated integrally with the output member 70.

The lock-up clutch 60 includes a second clutch pack 62 having a friction plate or a friction member. The second clutch pack 62 is disposed between the rotor hub 43 and the output plate 64.

A second piston plate 61 is disposed at an axial front side of the second clutch pack 62. When the second piston plate 61 presses the second clutch pack 62 in the axial direction, the rotor hub 43 and the output plate 64 are connected so that the mutual rotations thereof are restricted. Therefore, a rotational force of the rotor hub 43 may be transmitted to the output plate 64 and the output member 70 via the lock-up clutch 60. When the second piston plate 61 does not press the second clutch pack 62, the mutual rotations of the rotor hub 43 and the output plate 64 are not restricted. Therefore, a rotational force of the rotor hub 43 is transmitted to the output member 70 through the torque converter.

The second piston plate 61 extends in the radial direction. An outer peripheral surface of a radial outer side of the second piston plate 61 and the inner peripheral surface of the rotor holder 44 face each other and slidably adjoin each other in the axial direction. An inner peripheral surface of a radial inner side of the second piston plate 61 and an outer peripheral surface of the output member 70 face each other and slidably adjoin each other in the axial direction.

As illustrated in FIG. 8, when the fluid is introduced into a rear space A3 of the second piston plate 61 through the transmission, the second piston plate 61 moves axially forward relative to the rotor holder 44 and does not press the second clutch pack 62.

As illustrated in FIG. 8, when the fluid is introduced into a front space A4 of the second piston plate 61 through the transmission, the first piston plate 21 moves axially backward relative to the rotor holder 44 and presses the second clutch pack 62.

Figure 7:
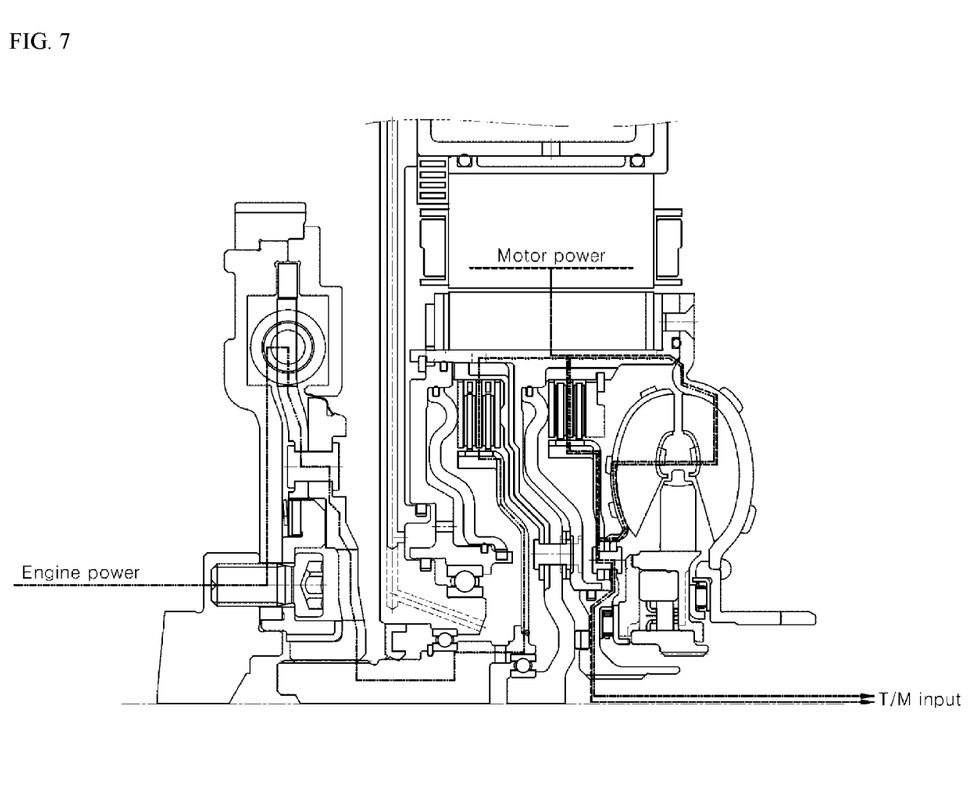
FIG. 7 is a view illustrating a transmission route of driving power in FIG. 1.

Hereinafter, a driving operation of the hybrid driving module will be described with reference to FIG. 7.

First, the engine clutch 20 does not transmit power between the input plate 12 and the first carrier 23 when the motor 40 provides driving power but the engine does not provide driving power. When it is necessary to boost torque of the motor 40 and transmit the torque to the transmission, i.e., when a rotational speed of the motor 40 is higher than a rotational speed of the output member 70, the torque of the motor 40 is boosted by the torque converter and transmitted to the output member 70. Therefore, when the rotational speed of the output member 70 becomes close to the rotational speed of the motor 40, the lock-up clutch 60 operates, and the rotor hub 43 and the output member 70 are connected directly to each other.

Meanwhile, when the engine provides driving power or when the engine and the motor 40 provide driving power, the engine clutch 20 transmits power between the input plate 12 and the first carrier 23. Then, the torque of the engine and the torque of the motor 40 are combined and transmitted to the output member 70 through the torque converter. The torque of the engine and the torque of the motor 40 may be boosted by the torque converter and transmitted to the output member 70. When a speed ratio (SR) between the rotor hub 43 and the output member 70 is 1:1, the rotor hub 43 and the output member 70 are connected directly to each other by the lock-up clutch 60.

According to the hybrid driving module according to the embodiment, the torque of the engine is transmitted to the rotor hub 43 through the input plate 12, the engine clutch 20, and the first carrier 23, and the hub ridge 46 is not in the torque transmission route.

[Structure for Coupling Rotor Hub and Hub Ridge]

Hereinafter, a structure for coupling the rotor hub 43 and the hub ridge 46 will be described in detail with reference to FIGS. 1 to 6.

Figure 4:
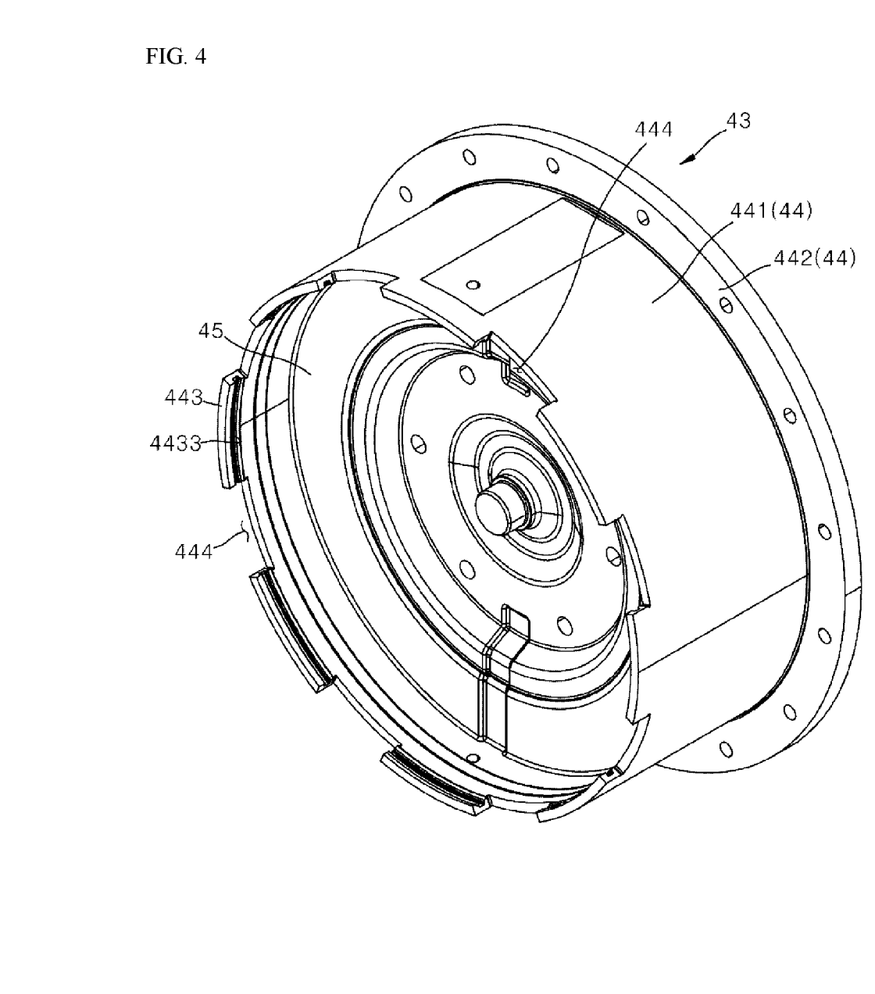
FIG. 4 is a perspective view illustrating a rotor hub.

Referring to FIG. 4, the rotor hub 43 has the rotor holder 44 and the hub plate 45. The rotor holder 44 is a part that adjoins the rotor 42 and supports the rotor. The rotor holder 44 includes the cylindrical radial support portion 441 extending in the axial direction, and the axial support portion 442 extending outward in the radial direction from the axial front end of the radial support portion 441. The radial support portion 441 supports an inner peripheral surface of the rotor 42, and the axial support portion 442 supports an axial rear end of the rotor 42. The axial support portion 442 extending in the radial direction is not formed at a front end of the radial support portion 441. Therefore, the rotor 42 is externally inserted from the front side to the rear side in the axial direction, such that an inner peripheral surface of the rotor 42 is supported to face an outer peripheral surface of the radial support portion 441, and an axial rear end of the rotor 42 is supported to face a front surface of the axial support portion 442.

A plurality of spline shape portions 443 is provided at an axial front side of the radial support portion 441. The spline shape portion 443 further extends from an axial front end to an axial front side of the radial support portion 441. The spline shape portion 443 has a shape made by extending a curved surface of the radial support portion 441. That is, an outer peripheral surface and an inner peripheral surface of the spline shape portion 443 may respectively have shapes made by extending an outer peripheral surface and an inner peripheral surface of the radial support portion 441. Therefore, the spline shape portion 443 does not hinder a process in which the rotor 42 is fitted with an outer peripheral side of the radial support portion 441 and a process in which a first carrier 23 of the engine clutch 20 is fitted with an inner peripheral side of the radial support portion 441. The plurality of spline shape portions 443 have the same width in the circumferential direction and are disposed at equal intervals.

Spline grooves 444 are provided between the plurality of spline shape portions 443. The plurality of spline grooves 444 have the same width and the same depth in an axially backward direction. The spline shape portions 443 and the spline grooves 444 may be formed by forming grooves at equal intervals in the circumferential direction at a front end of the cylindrical radial support portion 441.

Snap grooves 4433 are formed in inner peripheral surfaces of the plurality of spline shape portions 443 and disposed on the same plane perpendicular to the axial direction. The snap groove 4433 has a shape extending in the circumferential direction from the inner peripheral surface of the spline shape portion 443. An interval between an axial rear end of the snap groove 4433 and an axial rear end of the spline groove 444 corresponds to an axial thickness of a fitting portion 461 of a hub ridge 46 to be described below. The snap groove 4433 is a groove into which a ridge fixing member, i.e., a ridge snap ring 49 is fitted to prevent the hub ridge 46 from separating axially forward after the fitting portion 461 of the hub ridge 46 is fitted into the spline groove 444.

The hub plate 45 extends radially inward from an inner peripheral surface of the radial support portion 441 and has a shape similar to a disk. A center of the hub plate 45 has a rotary shaft protruding forward.

Figure 5:
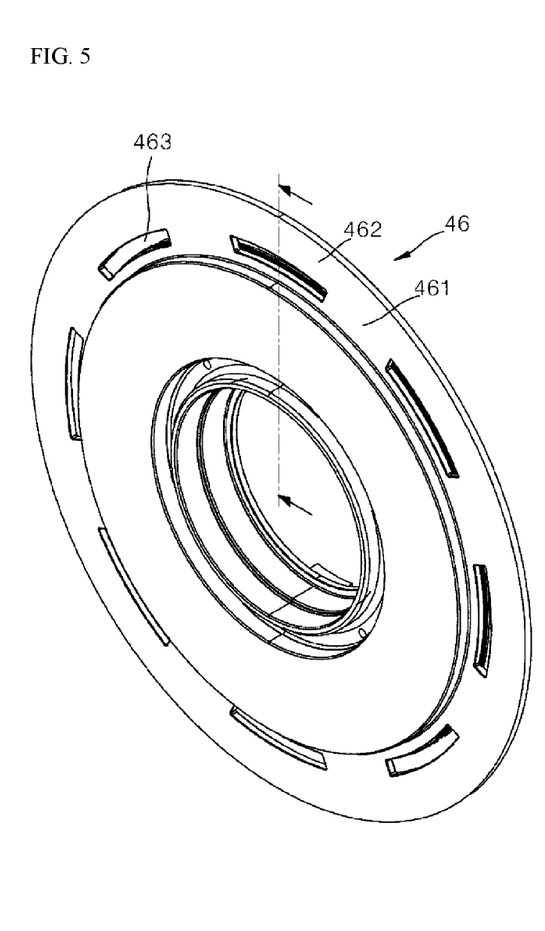
FIG. 5 is a perspective view illustrating a hub ridge.
Figure 6:
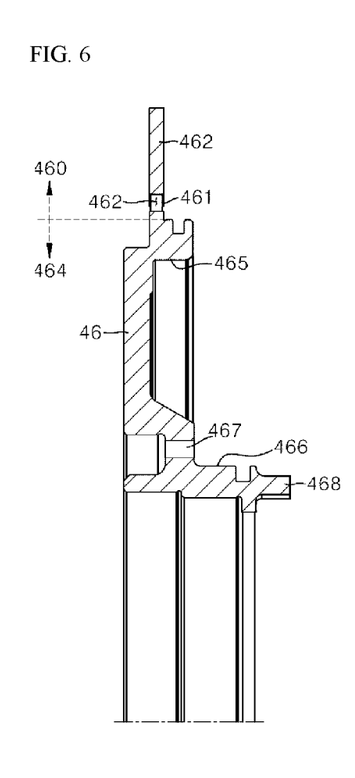
FIG. 6 is a view illustrating a cross-section of an arrow part in FIG. 5.

Referring to FIG. 5, the hub ridge 46 may be an approximately disk or circular disk-shaped member opened at a center side thereof and extending in the radial direction.

The hub ridge 46 includes a piston installation portion 464, and a hub coupling portion 460 provided at a radial outer side of the piston installation portion 464.

The first piston plate 21 of the engine clutch 20 is installed at an axial rear side of the piston installation portion 464. The piston installation portion 464 has a radial outer-inner peripheral surface 465 extending backward from the radial outer end in the axial direction, and a radial inner-outer peripheral surface 466 extending backward from the radial inner end in the axial direction. An outer peripheral surface of a radial outer end of the first piston plate 21 adjoins the radial outer-inner peripheral surface 465 so as to be slidable in the axial direction. An inner peripheral surface of a radial inner end of the first piston plate 21 adjoins the radial inner-outer peripheral surface 466 so as to be slidable in the axial direction.

A flow hole 467 is provided in the piston installation portion 464 so that the fluid may be introduced into the space defined by the first piston plate 21, a rear surface of the piston installation portion 464, the radial outer-inner peripheral surface 465, and the radial inner-outer peripheral surface 466.

In addition, a slide protrusion 468 extending axially backward is provided on the piston installation portion 464.

The slide protrusion 468 may be provided in the vicinity of the radial inner-outer peripheral surface 466. The first piston plate 21 has a slide groove having a shape complementary to the slide protrusion 468. Therefore, the first piston plate 21 may slide in the axial direction in the state in which the rotation thereof is restricted by the hub ridge 46.

The hub ridge 46 may be installed on the rotor hub 43 in the state in which the first piston plate 21 is installed on the hub ridge 46. The hub coupling portion 460 is provided at the radial outer side of the piston installation portion 464 and serves as a structure for assembling the hub ridge 46 to the rotor hub 43.

The hub coupling portion 460 has the plurality of fitting portions 461 extending radially outward from the piston installation portion 464 and inserted into the plurality of spline grooves 444. The fitting portion 461 interferes with the spline shape portion 443 in the circumferential direction so that the rotations of the hub ridge 46 and the rotor hub 43 are restricted.

The hub coupling portion 460 has a radius extension portion 462 further extending radially outward from the fitting portion 461. The radius extension portion 462 is a portion further protruding radially outward than the radial support portion 441 in the state in which the hub ridge 46 is installed on the rotor hub 43.

The radius extension portion 462 supports an axial front end of the rotor 42. That is, the radius extension portion 462 and the axial support portion 442 support the rotor 42 interposed therebetween in the axial direction.

An accommodation groove 463 is provided between the plurality of fitting portions 461. The spline shape portion 443 of the rotor hub 43 is inserted into the accommodation groove 463. The radius extension portion 462 may be a ring shape connected in the circumferential direction. Then, the accommodation groove 463 may have a hole shape closed in the circumferential direction and the radial direction and penetrated in the axial direction.

From another standpoint, the hub coupling portion 460 may be a ring-shaped portion extending radially from a radial outer end of the piston installation portion 464. The ring-shaped portion has a plurality of accommodation grooves 463 into which the plurality of spline shape portions 443 is respectively inserted. The accommodation groove 463 may be a through-hole having an arc shape. Further, the portions disposed between the plurality of accommodation grooves 463 in the circumferential direction may constitute the fitting portions 461 fitted into the spline grooves 444. Therefore, the portion of the hub coupling portion 460, which is disposed radially outside the accommodation groove 463 and the fitting portion 461, may constitute the radius extension portion 462 further extending radially outward than the radial support portion 441.

According to the structure of the hub ridge 46 described above, the first piston plate 21 is installed and the radius extension portion 462 of the hub ridge 46 fixes the rotor 42 during the process in which the hub ridge 46 is installed on the rotor hub 43. From another standpoint, it can be said that the rotor 42 restricts the axially backward movement of the hub ridge 46.

That is, the axially forward separation of the hub ridge 46 may be restricted by the ridge snap ring 49, and the axially backward movement of the hub ridge 46 may be restricted by the axial rear end of the spline groove 444 and/or the rotor 42.

The hub ridge 46 may have an axial clearance occurring between the ridge snap ring 49 and the axial rear end of the spline groove 444 because of a processing deviation of the spline groove 444 and a thickness deviation of the hub ridge 46. That is, the hub ridge 46 may vibrate by moving in the axial direction, which may cause noise.

Therefore, the hybrid driving module may further include an elastic body 90 configured to elastically press the hub ridge 46 axially forward and push the hub ridge 46 toward the ridge snap ring 49.

The elastic body 90 may be installed at any position as long as the elastic body 90 at that position may appropriately push the hub ridge 46 toward the ridge snap ring 49. FIG. 1 illustrates a structure in which first to fourth elastic bodies 91, 92, 93, and 94 are installed at different positions and press the hub ridge 46 toward the ridge snap ring 49. However, this configuration is provided for the convenience of description, and the elastic body 90 may include only any one of the first to fourth elastic bodies 91, 92, 93, and 94. Of course, the elastic body 90 may include two or more elastic bodies 90 among the first to fourth elastic bodies 91, 92, 93, and 94.

First, the elastic body 90 may be configured to elastically press the radius extension portion 462 forward from the rotor 42 and push the hub ridge 46 toward the ridge snap ring 49. The first elastic body 91 and the second elastic body 92 illustrated in FIG. 1 correspond to this configuration. For reference, FIG. 3 illustrates that only the first elastic body 91 between the first elastic body 91 and the second elastic body 92 is applied, and the second elastic body 92 is not applied.

The first elastic body 91 may be interposed between the radius extension portion 462 and the front end of the rotor 42. The second elastic body 92 may be interposed between the rear end of the rotor 42 and the axial support portion 442. FIG. 1 illustrates an example in which the first elastic body 91 is disposed on the retainer 420 and the front end of the rotor 42, and the second elastic body 92 is disposed between the rear end of the rotor 42 and the retainer 420. However, the first elastic body 91 and the second elastic body 92 may of course be disposed further axially outward than the retainer 420 based on the rotor 42.

The first elastic body 91 and/or the second elastic body 92 may provide an elastic force in a direction in which the first elastic body 91 and/or the second elastic body 92 is expanded in the axial direction. Therefore, the hub ridge 46 is pressed against the ridge snap ring 49 by the first elastic body 91 and/or the second elastic body 92, and thus the hub ridge 46 does not vibrate or rattle. In addition, the rotor 42 may also be securely supported in the axial direction between the axial support portion 442 and the radius extension portion 462.

Next, the elastic body 90 may be configured to elastically press the piston installation portion 464 forward from the engine clutch 20 and push the hub ridge 46 toward the ridge snap ring 49. The third elastic body 93 and the fourth elastic body 94 illustrated in FIG. 1 correspond to this configuration. For reference, FIG. 3 illustrates that only the fourth elastic body 94 between the third elastic body 93 and the fourth elastic body 94 is applied, and the third elastic body 93 is not applied.

The engine clutch 20 is installed in a space disposed radially inside the radial support portion 441 and corresponding to the axial front side of the hub plate 45. The engine clutch 20 includes the first clutch pack 22 and the first carrier 23. The first carrier 23 may be installed on the hub plate 45 of the rotor hub 43. The first carrier 23 rotates integrally with the rotor hub 43. A radial outer side of the first clutch pack 22 is connected to the first carrier 23, and a radial inner side of the first clutch pack 22 is connected to the input member 10. Clutch plates connected to the first carrier 23 and clutch plates connected to the input member 10 are alternately disposed, and friction members are interposed between the clutch plates.

A radial outer peripheral surface of the first carrier 23 and an outer peripheral surface provided at a radial outer side of the piston installation portion 464 of the hub ridge 46 face an inner peripheral surface of the radial support portion 441 of the rotor holder 44. A front end of the first carrier 23 faces a radial outer end of the piston installation portion 464 of the hub ridge 46.

The third elastic body 93 may be interposed between the front end of the first carrier 23 and the radial outer end of the piston installation portion 464 of the hub ridge 46. Further, the third elastic body 93 provides an elastic force that elastically restore the third elastic body 93 in a direction in which the third elastic body 93 expands in the axial direction. Therefore, the first carrier 23 and the hub ridge 46 are elastically pressed by the third elastic body 93 in a direction in which the first carrier 23 and the hub ridge 46 move away from each other. Therefore, the hub ridge 46 is pushed against the ridge snap ring 49.

The fourth elastic body 94 may be installed on the first clutch pack 22. The fourth elastic body 94 may serve as a return spring for the first piston plate 21. The fourth elastic body 94 is disposed between the plurality of clutch plates and spreads the clutch plates in a direction in which the first clutch pack 22 is spread in the axial direction. The elastic force of the fourth elastic body 94 pushes the first piston plate 21 against the hub ridge 46. Then, the hub ridge 46 is elastically pressed against the ridge snap ring 49.

The elastic bodies 90, i.e., the first to fourth elastic bodies 91, 92, 93, and 94 may each be an annular disk spring or a wave washer. In the embodiment, the structure is described, in which the first to third elastic bodies 91, 92, and 93 are disk springs and the fourth elastic body 94 is a wave washer. However, the types of springs are not limited thereto.

[Assembly of Hybrid Driving Module]

Hereinafter, an assembly process related to the rotor 42 and the hub ridge 46 in the process of assembling the hybrid driving module according to the embodiment will be described.

First, the rotor 42 is externally inserted into the rotor holder 44 of the rotor hub 43 in the direction from the front side to the rear side in the axial direction. At the time of installing the rotor 42, the retainers 420 are installed at two opposite ends in the axial direction. Further, the first elastic body 91 and/or the second elastic body 92 is installed.

Further, the engine clutch 20 and the input member 10 are installed on the front surface of the hub plate 45. In this case, the third bearing B3 is interposed between the input member 10 and the hub plate 45. In this case, the fourth elastic body 94 may be installed on the first clutch pack 22 of the engine clutch 20. In addition, the engine clutch 20 may be installed on the rotor hub 43, and then the third elastic body 93 may be installed at the front side of the first carrier 23 of the engine clutch 20.

Next, the hub coupling portion 460 of the hub ridge 46 on which the first piston plate 21 is installed is assembled with the spline shape portion 443 and the spline groove 444 of the rotor holder 44 and fitted with the piston installation portion 464. In this case, the radius extension portion 462 of the hub ridge 46 supports the front end of the rotor 42.

Next, the ridge snap ring 49 is fitted into the snap groove 4433 provided in the inner peripheral surface of the spline shape portion 443. The elastic body 90 presses the hub ridge 46 toward the ridge snap ring 49, such that the hub ridge 46 is securely supported without swaying.

While the present invention has been described above with reference to the accompanying drawings, the present invention is not limited to the drawings and the embodiments disclosed in the present specification, and it is apparent that the present invention may be variously changed by those skilled in the art without departing from the technical spirit of the present invention. Further, even though the operational effects of the configurations of the present invention have not been explicitly disclosed and described in the description of the embodiment of the present invention, the effects, which can be expected by the corresponding configurations, should, of course, be acceptable.

The invention claimed is:

1. A hybrid driving module comprising:
a motor comprising a stator and a rotor;
a rotor hub configured to support the rotor and rotate integrally with the rotor; and
a hub ridge coupled to the rotor hub so that a rotation thereof is restricted,
wherein the rotor hub comprises a rotor holder configured to support the rotor,
wherein the rotor holder comprises:
a radial support portion extending in an axial direction and configured to support a radial inner portion of the rotor;
an axial support portion disposed at one side of the radial support portion based on the axial direction, extending in a radial direction from the radial support portion, and configured to support one side of the rotor based on the axial direction;
a plurality of spline shape portions provided at the other side of the radial support portion based on the axial direction and further extending to the other side in the axial direction from the other end of the radial support portion based on the axial direction; and
a plurality of spline grooves provided between the plurality of spline shape portions and opened at the other side based on the axial direction, wherein the hub ridge comprises:
a piston installation portion disposed at a radial inner side of the plurality of spline shape portions; and
a hub coupling portion connected to a radial outer side of the piston installation portion, wherein the hub coupling portion comprises:
a plurality of fitting portions, of which the rotations are restricted by the rotor hub by interfering with the plurality of spline shape portions in a circumferential direction in a state in which the plurality of fitting portions are respectively inserted into the plurality of spline grooves;
a radius extension portion further extending radially outward from the fitting portions and further protruding outward in the radial direction than the radial support portion; and
an accommodation groove provided between the plurality of fitting portions and configured to accommodate a spline shape portion of the plurality of spline shape portions, and
wherein the radius extension portion supports the other side of the rotor based on the axial direction.

2. The hybrid driving module of claim 1, wherein a ridge fixing member is installed on the spline shape portion and supports the other side of the hub ridge in the axial direction so that the hub ridge does not separate to the other side based on the axial direction.

3. The hybrid driving module of claim 2, wherein the spline shape portion has a snap groove extending in the circumferential direction from an inner peripheral surface thereof, and the ridge fixing member comprises a ridge snap ring fitted with the snap groove.

4. The hybrid driving module of claim 1, wherein the radius extension portion has a ring shape connected in the circumferential direction, and the accommodation groove has a hole shape closed in the circumferential direction and the radial direction and penetrated in the axial direction.

5. The hybrid driving module of claim 1, further comprising:
an elastic body configured to elastically bias the hub ridge in an other direction of the axial direction.

6. The hybrid driving module of claim 5, wherein the elastic body comprises a first elastic body interposed between the radius extension portion and the rotor.

7. The hybrid driving module of claim 5, wherein the elastic body comprises a second elastic body interposed between the rotor and the axial support portion.

8. The hybrid driving module of claim 5, wherein an engine clutch is provided in a space at a radial inner side of the radial support portion and disposed on one side based on the axial direction from the hub ridge, a first carrier of the engine clutch is fixed to the rotor hub, and the elastic body comprises a third elastic body interposed between the first carrier and the hub ridge.

9. The hybrid driving module of claim 5, wherein an engine clutch comprising a first clutch pack, is provided in a space at a radial inner side of the radial support portion, and is disposed at the one side based on the axial direction from the hub ridge,
wherein a first piston plate is disposed between the first clutch pack and the hub ridge and slides in the axial direction so as to press or release the first clutch pack in the axial direction,
wherein the elastic body comprises a fourth elastic body provided in the first clutch pack to elastically bias the first clutch pack in a direction in which the first clutch pack is spread in the axial direction, and
wherein an elastic force of the fourth elastic body biases the first piston plate in the other direction of the axial direction.

10. The hybrid driving module of claim 1, wherein the rotor hub comprises a hub plate extending radially inward from the rotor holder, an input member is provided at an axial front side from the hub plate and receives an output of an engine, an output member is provided at an axial rear side from the hub plate and transmits power of the hybrid driving module to a transmission, and the hub ridge is disposed at an axial front side of the hub plate.

* * * * *